US012596939B2

(12) United States Patent
Bhate et al.

(10) Patent No.: US 12,596,939 B2
(45) Date of Patent: Apr. 7, 2026

(54) AUTOMATIC LABELING OF DATA BY AN ENTITY GATHERING THE DATA

(71) Applicant: FORD GLOBAL TECHNOLOGIES, LLC, Dearborn, MI (US)

(72) Inventors: Harsh Bhupendra Bhate, Dearborn, MI (US); Vyacheslav Zavadsky, Ottawa (CA); Ziwei Zeng, Redmond, WA (US); Senthil Kumar Natarajan, Chennai (IN); Uttara Thakre, Dearborn, MI (US); Panduranga Chary Kondoju, Canton, MI (US); Aishwarya Vaibhav Kadam, Canton, MI (US)

( * ) Notice: Subject to any disclaimer, the term of this patent is extended or adjusted under 35 U.S.C. 154(b) by 303 days.

(21) Appl. No.: 18/356,702

(22) Filed: Jul. 21, 2023

(65) Prior Publication Data

US 2023/0376805 A1 Nov. 23, 2023

Related U.S. Application Data

(63) Continuation of application No. 17/746,746, filed on May 17, 2022.

(51) Int. Cl.
G06N 5/04 (2023.01)
G05B 13/04 (2006.01)
(Continued)

(52) U.S. Cl.
CPC ................ G06N 5/04 (2013.01); G06N 3/08 (2013.01); G06N 5/046 (2013.01); G06N 20/00 (2019.01);
(Continued)

(58) Field of Classification Search
CPC .......... G06N 5/04; G06N 5/046; G06N 20/00; G06N 20/20; G06N 3/098; G05B 13/027;
(Continued)

(56) References Cited

U.S. PATENT DOCUMENTS

| | | | | |
|---|---|---|---|---|
| 11,568,081 B2 * | 1/2023 | Mukhopadhyay | ....... | G06N 5/04 |
| 12,243,420 B1 * | 3/2025 | Rothschild | ....... | G08G 1/096775 |

(Continued)

FOREIGN PATENT DOCUMENTS

EP 3422262 A1 1/2019

OTHER PUBLICATIONS

Singh, Mithilesh Kumar, AADGen: Automatic Annotated Data Generation for Training Text Detection and Recognition Models, IEEE International Conference for Innovation in Technology (INOCON), Nov. 2020, 5 pages, [retrieved on Jul. 16, 2025], Retrieved from the Internet: <URL:http://ieeexplore.ieee.org/>.*

(Continued)

*Primary Examiner* — Geoffrey R St Leger
(74) *Attorney, Agent, or Firm* — Christopher Storms; Brooks Kushman P.C.

(57) ABSTRACT

A system receives identification of data to be gathered, via a request configured based on a configuration file associated with a machine learning model stored by a vehicle. The system receives identification of how the data is to be labeled, defined by the configuration file and create one or more topics for publication of the data, onboard the vehicle, the publication including both the gathered data and any meta-data usable to label the data in accordance with the definitions in the configuration file. Also, the system subscribes to the topics to receive the published data and the metadata and appends labels to the data, using the metadata, to label the data in accordance with the definitions for labeling in the configuration file. The system saves the labeled data in vehicle memory as data associated with the model.

20 Claims, 9 Drawing Sheets

(51) Int. Cl.

| | |
|---|---|
| *G06N 3/08* | (2023.01) |
| *G06N 3/098* | (2023.01) |
| *G06N 5/046* | (2023.01) |
| *G06N 20/00* | (2019.01) |
| *G06N 20/20* | (2019.01) |
| *H04L 67/12* | (2022.01) |
| *G05B 13/02* | (2006.01) |

(52) U.S. Cl.
CPC ............ *H04L 67/12* (2013.01); *G05B 13/027* (2013.01); *G05B 13/04* (2013.01); *G06N 3/098* (2023.01); *G06N 20/20* (2019.01)

(58) Field of Classification Search
CPC .................. G05B 13/04; B60W 50/00; B60W 2050/0005; H04L 67/12; H04L 67/30
See application file for complete search history.

(56) References Cited

U.S. PATENT DOCUMENTS

| | | | |
|---|---|---|---|
| 2020/0201727 A1 | 6/2020 | Nie et al. | |
| 2021/0133632 A1 | 5/2021 | Elprin et al. | |
| 2023/0368043 A1* | 11/2023 | Macklin | ................. G06N 5/022 |

OTHER PUBLICATIONS

Azure Monitor Overview, https://learn.microsoft.com/en-us/azure/azure-monitor/overview, Nov. 1, 2022, 14 pages.

\* cited by examiner

AUTOMATIC LABELING OF DATA BY AN ENTITY GATHERING THE DATA

CROSS-REFERENCE TO RELATED APPLICATIONS

This application is a continuation of U.S. application Ser. No. 17/746,746 filed May 17, 2022, the disclosure of which is hereby incorporated in its entirety by reference herein.

TECHNICAL FIELD

The illustrative embodiments generally relate to automatic labeling of data by an entity gathering the data.

BACKGROUND

Vehicles are becoming ever more interconnected and capable. Complex computing systems and onboard microprocessors create a mobile computing environment capable of delivering a suite of services, smart sensing, reactive and dynamic control and advanced driver feedback. Connectivity capabilities provide opportunities for vehicles to communicate with each other, with infrastructure and with cloud-based backend servers. New software updates can be pushed directly to the vehicle, updating various original equipment manufacturer (OEM) installed software and firmware, as well as elective applications included by a vehicle owner.

With continual software development comes continual opportunity for improvement. Each vehicle represents a mobile data gathering entity having countless data observations and a unique experience. Connected vehicles can report observations, however marshalling and distilling such a massive amount of data becomes a virtually impossible task for even a group of people to complete. Smart systems can get smarter through machine learning, but modifying and improving a model for such a disparate set of vehicles or circumstances can be difficult, it involves the handling of a significant amount of data as well as requiring that the model be tuned to observations that may be relevant to only a single vehicle or a group of vehicles. Sensing and data can relate to habits, environments, local conditions, etc. whose applicability may be highly situational. This presents an incredible challenge when deciding how to tune models and have software learn for both global applicability and for individual improvement. Continually tuning such models for even ten thousand vehicles could place a massive burden on backend servers, let alone doing so for tens of millions of active vehicles.

SUMMARY

In a first illustrative embodiment, a system includes one or more processors of a vehicle configured to receive identification of data to be gathered, via a request configured based on a configuration file associated with a machine learning model stored by the vehicle. The one or more processors are also configured to receive identification of how the data is to be labeled, defined by the configuration file and create one or more topics for publication of the data, onboard the vehicle, the publication including both the gathered data and any meta-data usable to label the data in accordance with the definitions in the configuration file. Also, the one or more processors are configured to subscribe to the topics to receive the published data and the metadata and append labels to the data, using the metadata, to label the data in accordance with the definitions for labeling in the configuration file. The one or more processors are further configured to save the labeled data in vehicle memory as data associated with the model.

In a second illustrative embodiment, a method includes receiving identification of data to be gathered, via a request configured based on a configuration file associated with a machine learning model stored by the vehicle. The method also includes receiving identification of how the data is to be labeled, defined by the configuration file and creating one or more topics for publication of the data, onboard the vehicle, the publication including both the gathered data and any meta-data usable to label the data in accordance with the definitions in the configuration file. The method further includes subscribing to the topics to receive the published data and the metadata, appending labels to the data, using the metadata, to label the data in accordance with the definitions for labeling in the configuration file, and saving the labeled data in vehicle memory as data associated with the model.

In a third illustrative embodiment, a non-transitory computer-readable storage medium stores instructions that, when executed by one or more processors, cause the one or more processors to perform a method that includes receiving identification of data to be gathered, via a request configured based on a configuration file associated with a machine learning model stored by the vehicle. The method also includes receiving identification of how the data is to be labeled, defined by the configuration file and creating one or more topics for publication of the data, onboard the vehicle, the publication including both the gathered data and any meta-data usable to label the data in accordance with the definitions in the configuration file. The method further includes subscribing to the topics to receive the published data and the metadata, appending labels to the data, using the metadata, to label the data in accordance with the definitions for labeling in the configuration file, and saving the labeled data in vehicle memory as data associated with the model.

DETAILED DESCRIPTION

Figure 1:
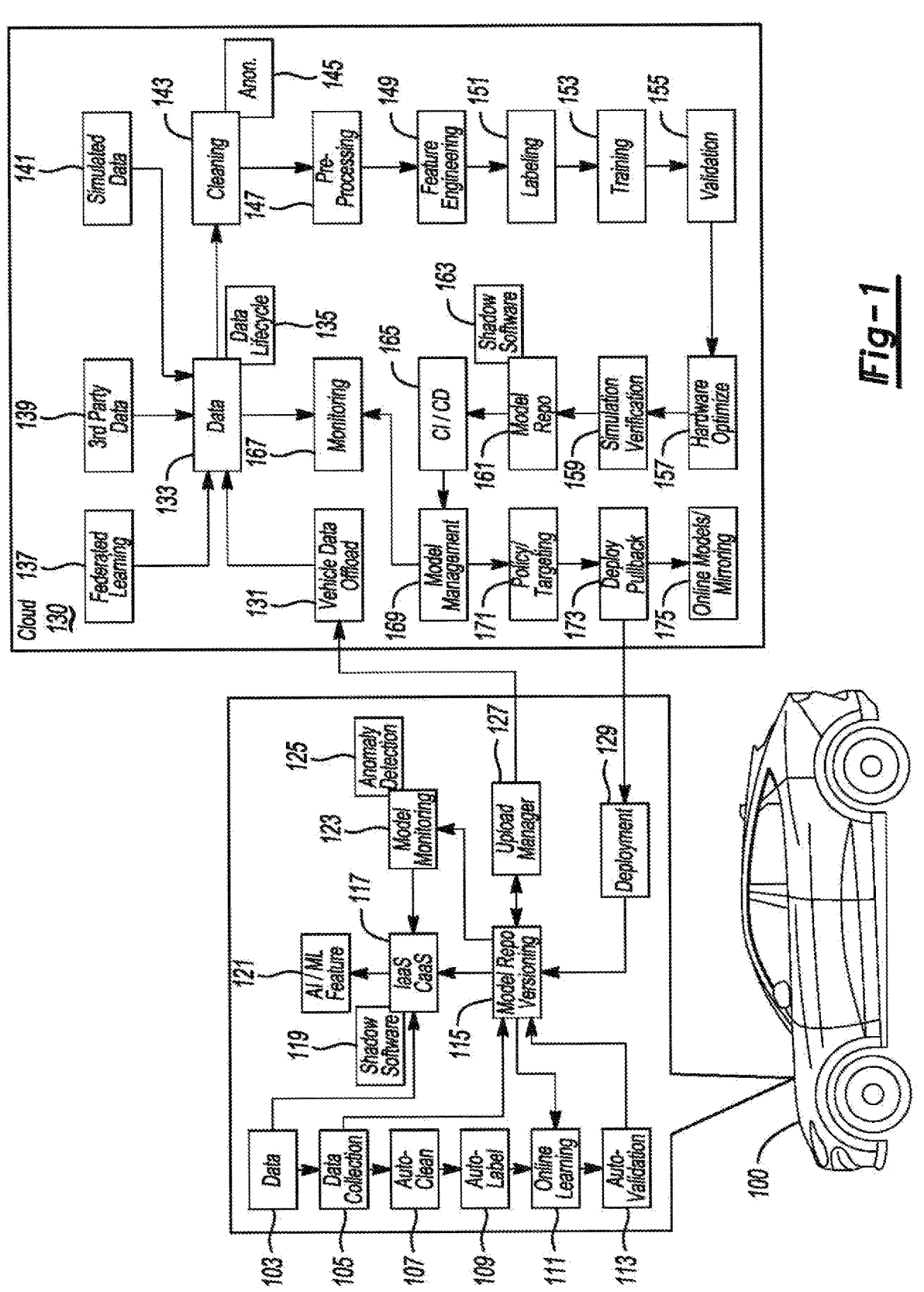
FIG. 1 shows an illustrative example of an end-to-end AI/ML Ops Pipeline.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Vehicles may include fully networked vehicles such as vehicles with both internal and external communication. Internal communication can be achieved by short-range and long-range wireless communication as well as wired communication through a vehicle bus, e.g. a control area network (CAN) bus and/or other data connections. External connections can include wireless connections to, for example, other vehicles (V2V), infrastructure (V2I), edge processors (V2E), mobile and other devices (V2D), and the cloud (V2C) through cellular or other wireless connectivity. Collectively these connections may be referred to as V2X communications, wherein X is any entity with which a vehicle is capable of communication. These vehicles may include distributed processing onboard, the capability of leveraging edge and cloud processing, and specialized architecture that can be repurposed for the purpose of providing highly advanced computing services under at least certain circumstances.

Vehicles may also include software and firmware modules, and vehicle electronic control units (ECUs) may further include onboard processing. Vehicle features may include artificial intelligence and machine learning models that may provide advanced occupant services leveraging vehicle sensors and shared cloud data. The AI/ML models may be capable of self-advancement (online in-vehicle learning) to tune the models to a vehicle context and user preferred experience. Sensors may include, but are not limited to, cameras, LIDAR, RADAR, RFID, NFC, suspension sensing, occupant sensors, occupant identification, device sensing, etc.

The illustrative embodiments and the like propose an artificial intelligence (AI)/machine learning (ML) operations pipeline (collectively the "AI/ML Ops Pipeline") that provides strategically timed and placed machine learning opportunities that improve both the local and global models. This can leverage onboard computing, edge computing and cloud computing, and may strategically take advantage of the massive computing resources represented by each connected vehicle in a fleet. Vehicles can work to improve their own models for their own observations, situations and owner/occupant preferences. Improvements to global models may be realized and deployed to improve the experiences of all vehicles in a fleet, a locality, a subset (similar demographics, environments, etc.).

In at least one embodiment, model owners are able to define learning parameters for when a model should be trained, as well as provide training data and expected values for model performance, so models that are regressing can be identified, and new models can be tested, evaluated, validated and deployed. When control over these variables is given to model owners, the models owners can have responsibility for setting parameters about when a model should learn, without requiring direct control over the learning or even access to the learning process. At the same time, the AI/ML Ops Pipeline control can be model agnostic, if it receives properly formatted and defined information, it can act within its own confines to improve a model according to developer parameters, without any direct knowledge of why a model was developed or what an improvement strategy should achieve.

This paradigm allows disparate and discontented engineering teams and coders to develop a suite of self-improving tools and platforms without having to continually communicate about goals and intentions. If a model is suitable for deployment and includes the correct information, each team can proceed with its own objectives, relaying on the cohesive, interconnected system to provide the learning for improvement without directly attempting to monitor and train millions of versions of a deployed model, and without concern that their particular model is suffering from lack of oversight.

Artificial Intelligence (AI) may play a role as an enabler for an OEM in a digital transformation journey to a fully-connected smart vehicle. AI may affect the entire lifecycle of the vehicle from design to operation and vehicle disposal. AI-enabled experiences such as personalization, virtual assistants, driver assistance, predictive maintenance and self-driving cars may become increasingly important, and Business Ops team want to leverage AI/ML to solve real world problems. A fully networked vehicle (FNV) AI/ML Framework can provide tools, capabilities and best practices to accelerate data collection/processing, development/training, evaluation, deploying and operationalizing of ML models at scale. To provide greater compute, the framework can push enterprises to the edge—Vehicles, wallboxes, mobile app, 5G multi-access edge computing (MEC) and cloud computing can be leveraged to optimize performance and compute usage.

Most processes to create, build, validate, deploy, retrain and re-deploy AI/ML models on vehicles is fragmented. It is rarely automated and it involves significant manual steps collaborating with multiple teams, resulting in longer lead times to launch and fix adaptive vehicle features. These teams may suffer from fragmented AI/ML deployment strategy, a lack of a single framework to monitor manage lifecycle of AI ML models. Further, many teams, especially 3$^{rd}$ party application developers, are unable to perform rapid prototyping/validation of AI ML models on vehicles or test benches. This leads to conflicting goals and strategies and significant slowdown in improvement and deployment of models, and in some cases, may be near-prohibitive of model improvement.

The illustrative embodiments provide a methodology to operationalize and manage the lifecycle of ML models at scale. They represent examples of a holistic software platform to increase productivity and scalability of shipping, monitoring and managing the lifecycle of online AI/ML models for a wide variety of ML-based solutions across the cloud, vehicles, mobile apps and wallboxes.

The illustrative embodiments, and the like, may provide a cloud online model FNV AI/ML framework that allows for integration of ML models developed independently from each other, and yet that still allows these models to improve in an efficient and targeted manner. Through various aspects of standardization, guiding principles can allow for a cohesive approach to providing all the necessary information for the framework to function, even if an application developer plays no role in the framework and vice versa.

Self-service tools and dashboards can allow for testing and monitoring generated Insights in real time. The framework may support structured and unstructured data collection. The framework supports federated learning (learning from deployed models) and online learning (a vehicle learning from its own observations).

In the automotive context, the platform may be automotive open system architecture (AUTOSAR) compliant, allowing for standardized integration of features and applications from non-OEM devices in a way that allows vendors and providers to remain relatively ignorant of the platform, outside of the requirements for controlling data for the model (e.g., without limitation, expected inputs and outputs, training data, validation data, training triggers, etc.) When such data is required, it can be requested in a pre-formatted version that allows for integration into the platform without requiring the vendor to monitor the model once deployed.

Vehicle services may be abstracted through standard application programming interfaces (APIs) and service oriented architecture (SOA) that allows for request and response models that are application-agnostic as long as the application can handle the standardized data. A common software development kit (SDK) can be abstracted from the platform, providing centralized high-level functions.

High performance compute clusters (HPCC), a shared memory architecture, hardware abstraction and virtualization (Hypervisors/Containers) can provide online (in-vehicle) learning environments that are suited to model training in a dedicated scenario, wherein a model can be trained with strategic use of onboard resources and which does not necessarily require any cloud-access in order to train the model.

FIG. 1 shows an illustrative example of an end-to-end AI/ML Ops Pipeline. This example includes a portion of the pipeline that can run "online" (onboard the vehicle 100) and a portion that executes in the cloud/backend 130. The propose pipeline allows for the vehicle 100 to collect its own data, and make its own observations, as well as train its own models. Data is also sent back to the cloud 130 as desired, which can allow for federate learning opportunities as well as long-term data storage and management, and use of the data in improving other models that may not be deployed on the vehicle 100. The cloud 130 can also track deployed versions of models and store other models for rollback, as well as provide general management for the entire software system of a given vehicle, which may be useful in determining updates and global model deployment strategies.

An AI/ML feature 121 may reside on a vehicle 100 and communicate with inference and compute as a service 117 (IaaS and CaaS, respectively). Shadow software 119 can run a newly trained version of a model against live data sets to determine if the expected output from the new model is met, as well as to determine if the produced output reflects a better version of output than a presently deployed model 121 is achieving.

The vehicle 100 can gather data 103 from a variety of onboard systems and sensors, as dictated by data collection strategies 105. Each feature 121 may request its own data, and the data may be specifically collected and stored for a given feature pursuant to the collection requests, labeling and specific parameters associated with that feature (e.g., collection cycles, types of data, etc.). The vehicle 100 can automatically clean the data 107, removing any personal information and irrelevant information (irrelevant to the feature 121) and can engage in auto-labeling 109 as discussed in greater detail herein.

Once collected and labeled, the data can be used as training data for online learning 109, allowing for learning onboard the vehicle 100 based on data observed by the vehicle 100, giving a personalized training data set that is directly applicable to the relevant vehicle 100. The data can be stored locally until no longer needed, as well as uploaded to the cloud 130 as appropriate by an upload manager 127. Model versioning and repository 115 can track deployed versions and older, functional versions, in case model reversion or rollback is required, if a newly deployed model begins to regress, which can be determined based on, among other things, information provided by the model owner (developer).

Newly trained models can be validated onboard 113, which can also involve executing the models in shadow software using live data streams, wherein the model performance can be tracked in real time and contemplated against expected values (and currently deployed model performance) to avoid deployment of a model that, while newly trained, does not represent significant improvement as defined by, for example, the model owner.

Model monitoring 123 can provide continual oversight of executing models against model-owner defined parameters to detect outliers 125, which may signal regression or further learning opportunities.

The cloud 130 receives the vehicle data 131 and stores the data in a data repository 133, which can be a large scale data store that can store data from all vehicles to allow for federated learning opportunities and model improvement. Lifecycle management 135 for data can dictate when data is kept or removed, as well as ensure that data is being kept, edited, and deleted in accordance with any overall policies.

The data repository 133 can also receive data from federated learning 137, third parties 139 (e.g., services that provide general information, such as, but not limited to, traffic, environmental data, etc. and simulated data 141. Simulated data can be data usable for training that represents data that would be achieved or is expected to be achieved under certain conditions, and can be used in place of or in conjunction with real data when a data set needs additional information. Simulation models can also be trained off of real data to represent improved simulations of data as observed in real time when reported to the cloud 130 by vehicles 100.

Data in the repository 133 can be cleaned 143 and anonymized 145. The data may be pre-processed 147 for sorting and standardization. Pre-processing can include, but is not limited to, noise removal, other filtering, downsampling, upsampling, etc. It can be used for feature engineering 149 for new features, and it can be further labeled 151 and/or initially labeled (if not already labeled). Labeling onboard the vehicle 100 may take the form of labeling with respect to a given AI/ML feature (e.g., how that feature requests the data to be labeled), but a given piece of data may be usable for more than one reason, and therefore may benefit from a more comprehensive set of labeling. Once labeled, the data can be used to train any appropriate models 153 to which the labeled data may apply. This can provide a massive data input stream for cloud-based model training, and be useful for global training of models (deployed or new) that may all benefit from the observations of the group as a whole.

Any newly trained model may be subjected to verification and validation 155 in the cloud 130, which again can be done according to parameters defined by the feature owner. This may reveal whether a newly trained model is functional according to, for example, expected outputs. The performance of the model against every deployed version (which may be vehicle-specific, at some point, due to online learning) may not be easily trackable, but the performance against the expected values and globally deployed versions should be something that can be considered.

The model may further undergo hardware optimization 157 and be run in a simulated manner on an optimal set of virtual hardware 159 to verify the functionality and outputs of the model. In at least one example, this optimization may occur prior to distribution of the model. A functioning version of the model, if validated and verified through successful simulation, may be saved in the model repository 161. Model governance may also be provided, if desired, that attempts to ensure that the model is not biased, using ethical AI practices, and this may also occur pre-deployment. This model repository may also include the shadow software 163, which allows the model to be executed using real-time and continual data inputs, to provide further validation prior to deployment, as well as to ensure that the model does represent an improvement over an already-deployed version. Feature and model owners can define the parameters for improvement and/or new deployment, as well as regression and reversion parameters, allowing for granular control based on a configuration file without requiring live monitoring of the inputs and outputs of a given model and newly trained versions of that model as the model undergoes continuous integration and continuous development (CI/CD).

Model management processes 169 on the cloud can determine when and if to deploy a new version of a model, improved through the general gathering of data and retraining, for example. Cloud-based monitoring 167 and interpretability can continue to use live data stored in the repository 133 to monitor the expected performance of deployed models, allowing for identification of regression and unexpected outputs before a model regresses too far and/or performs far outside of operational parameters. Interpretability may provide explanations as to why a certain prediction was obtained, what pattern lead to the outcome, association of factors leading to an outcome, etc.

Policies and targeting 171 can determine which vehicles (or devices, e.g. phones, wallboxes, etc.) should receive a newly updated model and/or need a rollback/reversion to an old model, for example, when monitoring reveals that a previously deployed version is functioning anomalously. Deployment/rollback 173 will deliver the appropriate version of the model to a given vehicle 100 (or other entity) and online models 175 can track and mirror all deployed versions of models, so that monitoring 167 can faithfully track the performance of models under a much larger data set than the model will likely receive from a single entity to which it is deployed. The monitoring occurring under the larger data set can often reveal flaws or regression likelihoods far sooner than a vehicle 100 may, given the disparate volume of data provided to each entity relative to the cloud 130.

Through this cohesive pipeline models are continually improved both online (in the vehicle/entity) and in the cloud 130. Personalized improvements may be realized online in the vehicle 100, making the deployed version of the AI/ML feature 121 particular to that vehicle 100. Overall improvements may be realized through federated learning and cloud-based learning and monitoring, allowing for global deployment of improved versions of models. Feature owners can observe performance and improvements and redefine configuration files to represent more aggressive parameters for improvement, and both the vehicle 100 and the cloud 130 can monitor deployed models for outlier detection (again, using feature owner parameters if desired), as well as run shadow versions of newly trained models against live data sets (local and crowd-based) to determine whether a new model is functioning better than a deployed version and when the new model is ready for live deployment.

Figure 2:
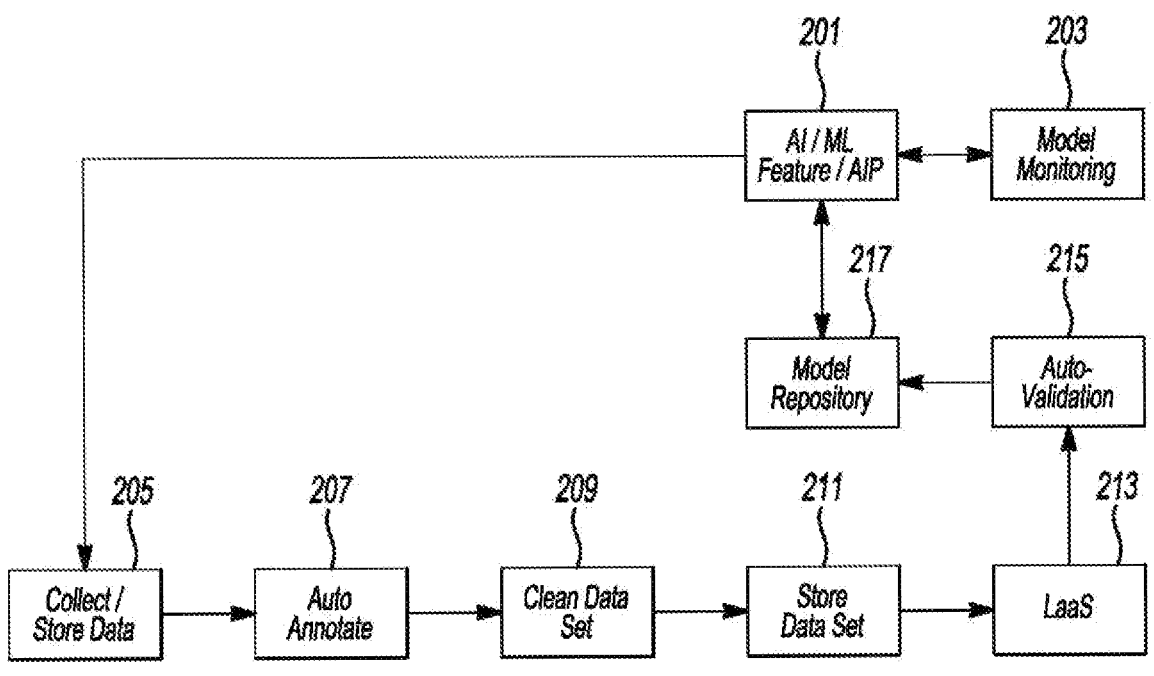
FIG. 2 shows an illustrative example of a learning process for a deployed model that may occur onboard a vehicle.

FIG. 2 shows an illustrative example of a learning process for a deployed model that may occur onboard a vehicle. An AI/ML feature 201 may represent the presently executing version of a given ML model, which may have a configuration file that defines its own requests and parameters for data gathering. The vehicle 100 can provide personalized data pursuant to such requests, collecting any permissible data requested 203 at any interval over which the data is requested. Policy management can dictate how much data is stored for a given model or service, since memory is not limitless, but each model 201 can have a personalized version of data gathered and annotated according to its own parameters, so that highly specific versions of the same general data may be stored for each model's use.

An automatic annotation/labeling process 205 can serve to label the data in real-time, allowing for immediate use of the data without having to wait for a manual labeling process to occur. This adds relevance, from the perspective of the given feature 201, to the data, producing a clean data set 207 which can be stored 209 with respect to the given feature 201. This data can be replaced by newer data or retained as long as needed and/or policy permits. Auto-labeling will be discussed in greater detail hereinbelow.

Learning as a Service (LaaS) 211 can provide online learning without recourse to cloud or edge computing if desired. This allows the vehicle 100 to self-improve its own models without having to wait for global improvement or deployment. This also allows for leveraging HPCC and targeted architecture of the vehicle 100 to train a model efficiently using vehicle 100 architecture and distributes the computing that would be used to train a model over the vast fleet of deployed vehicles 100, avoiding a need to keep all the computing power in a central repository and allowing use of the existing compute resources that reside in a given vehicle 100 or other entity.

A newly trained model can be validated 213 against a set of feature owner parameters to ensure general functionality, as well as to determine if the model represents an improved version of the current model 201. Once validated, the model can be moved to the model repository, which can track deployed versions and execute the new model as shadow software against live data, to ensure performance before deployment. All along, model monitoring 203 can track the performance of the executing live model 201 to avoid regression and to identify opportunities for training.

This online process allows for vehicles to self-improve their own models using data that is relevant to both the model and to the given vehicle. Because vehicles will observe significantly varied information, based on localities, overall usage, specific types of usage, owner/operator tendencies, environmental variances, etc., the experience of a given vehicle is much less homogeneous than, for example, that of an application residing on a desktop computer in a fixed location in an office environment. While any deployed model may vary in usage based on operator tendencies and goals, vehicles themselves represent continually variable operating environments and may require many additional variances over a typical model to ensure continued improvement and performance under a much wider variable set. This is not to say that vehicle deployed models will not benefit from global updates, but that they will also benefit from a variety of personal improvements in a manner that may be reflective of a much more custom environment relative to a given vehicle than a simple improvement of a model that is trained relative to one type of user (common goals and usage) versus another.

The model repository may exist in both the cloud and in the vehicle. The cloud version of the repository may store generic and architype models, which may be ML models that are widely applicable to a fleet, region, environment, etc. Both the cloud and vehicle may store specialized models, which are ML models that are unique to a given user or vehicle/VIN. These are models that may have been trained specifically for that user or vehicle. This could literally represent tens of millions of models in the cloud, and may need to be accommodated in a reasonable data management fashion.

Sources of the models can be both online (for specialized models, for example) and federated learning (for global models, for example). Data stored with respect to a given model may include, for example, but is not limited to, descriptions of models, algorithm classes (e.g. linear regression, decision tree, neural network, etc.), ML frameworks, contact information for model/feature owners, versions of training datasets used to achieve the model, vehicle dependencies, deployment modes, dependencies, activation triggers, etc.

The cloud 130 may be configured to continually deliver updated models, such as when a new ML model reaches a specific branch in the model repository. For a given model, updates may also be scheduled for vehicles that may benefit from an identified version change between a deployed model and a newly trained model. Other delivery triggers may include one-click deployment (instantaneous) or be based on vehicle and/or lifecycle events. For example, a valid vehicle state may be required before deployment, which can include, but is not limited to, subscription/enrollment, vehicle authorization, user authorization, certain software or hardware features being or not being present, etc.

Model Versioning is a process that may be associated with any AI/ML infrastructure. With the illustrative FNV AI/ML Architecture, the concepts of Online Learning and Federated Learning may benefit from modified model versioning in the vehicle to keep track of entities that are trained, finetuned, validated and updated in the vehicle. This may include a storage structure that is AUTOSAR compliant.

The model repository 115 component may, for example, leverage the Autosar persistency structure to introduce an in-vehicle model storage structure. The model repository may be designed to store model metadata/configuration (information describing model inputs and outputs, and versioning information) and model/coefficients (data needed to initialize kernel) in standardized, ara:persist based persistency interfaces.

Models may be divided in two categories: general models, or specialized models. General models represent a model applicable to a large fleet of a vehicles, e.g., all vehicles of particular model or all vehicles in particular region. Those models may be provided by cloud and trained in the cloud (even if training is based on data collected in vehicles or federated learning) and provided to a vehicle as part of normal software/configuration load. Specialized models are models trained for a particular user or a particular vehicle. They may not be a part of software load and can be trained either in vehicle or in cloud. Specialized models are typically derived from architype non-specialized models.

Ara:persist services may be leveraged to access model under general storage, and then coefficient services may be provided on top of ara:persist services to retrieve and update models in specialized storage. Models and any additional data or information can be updated independently for the generalized and specialized versions.

According to this paradigm, model retrieval may occur as follows in non-limiting illustrative example. An AI/ML Application may request compute, which can be a call to CaaS, using a generic model identifier. CaaS may pass a call to the ara:persist services for the general model, which will retrieve the general model from general model storage and pass the model back to CaaS. When the compute call includes a specialized version of a model (e.g., an online improvement learned for that vehicle), this may result in a call to the coefficient services which will use the ara:persist services to retrieve the specialized model from specialized model storage and pass the model back to the CaaS.

In a similar manner, a generic non-limiting example of learning to create a specialized version of an existing general model may occur as follows. The AI/ML application may have a CaaS call for learning, which may leverage LaaS. The base model for learning may be obtained from general model storage as described above, and CaaS may execute on the based model in conjunction with LaaS to train the model. The model may then be validated and LaaS may broadcast the training results. If the new model is to be stored, the Ai/ML application may, responsive to broadcast training results, update the coefficient services and request CaaS to utilize the coefficient services to store the new model in the specialized model storage.

For example, models that pertain to vehicle functions, such as an attachment angle may commonly be general in nature (since the angle of an attachment is a sort of "fact" whose nature should not change based on a given user's use or preference—i.e., a 30-degree angle is a 30-degree angle anywhere). On the other hand, models that pertain to a user—such as preferred window states and vehicle feature recommendations based on user-centric observations or environmental conditions may be specialized models that, while established from a base model, benefit significantly from specialized training in order to function in accordance with what a user would expect.

Models may also need to be validated before deployment, which can include aggressive testing under a variety of circumstances that help ensure that a given vehicle 100 will not behave unexpectedly under a very broad range of circumstances. Before a model is deployed to a production environment, the model may be deployed with supporting inference code to a cloud environment. There, test data and validation/threshold data can be used in conjunction with the model to ensure that expected results/thresholds are being achieved under execution of the test data. If the model is a new version of an existing model, differential testing may be used, which can compare the differences in execution from one version to another when the inputs (data) are the same.

The model may be deployed to a test bench, evaluation board, surrogate hardware, etc. for testing with a processor in loop evaluation. The model may also be deployed to target hardware (for the model) using a hardware in loop simulator, to evaluate performance with a simulation of the targeted hardware. The model may then further be evaluated using a test or prototype vehicle to provide vehicle in loop testing.

Additionally, as previously noted, there may be a shadow mode of the model that can be executed in the target environment without affecting performance of the presently executing model. This allows for prediction relative to both the existing and new version of the model. Using live data, prediction inputs and outputs can be monitored for both versions and saved, and the resulting data can be used to determine if the new version is functioning better than the existing version, which may serve as a deployment trigger.

Testing may also involve CPU/GPU and memory utilization performance, which may include, for example, prediction and task completion time. This can also include determining processor usage and a need for parallel processing, as well as RAM usage, code optimization requirements, caching needs and/or communication protocol testing. The vehicle is a complex computing environment where countless entities may be using limited resources, and where the vehicle itself must often be given primacy for these resources in the performance of driving tasks. Accordingly, it may be useful to understand the compute and resource burden imposed by a model prior to deployment of the model. A limited-scope release to a small subset of intended vehicles may also help reveal any overlooked operational issues before a wide scale distribution.

Since models can be updated both specifically for vehicles as well as globally, it may be difficult to robustly test all versions of trained models. While a general model can be significantly tested prior to deployment, a specific version of the model may only be tested onboard a vehicle. This can include, for example, validation against the model owner defined parameters and shadow execution to ensure compliance, but neither process can continue indefinitely or the newer model will never be deployed. At some point, often defined by the feature owner and subject to the feature/model owner constraints, the model will be deployed. Model monitoring, described in greater detail below, can continually monitor active versions of models to both improve performance and identify needs for rollback or reversion.

Continuous model monitoring can monitor, for example, drift data (unexpected inputs) and concept drift (unexpected outputs). When a model is initially trained, it may be done based on real data, but there may also be significant assumptions made about both the consistency of that data and the fact that the initial training data is actually representative of what a given vehicle will encounter. Even when a model is newly trained to a new version, there is an assumption that the new data that resulted in the new version will continue to reflect the data that will continue to be observed. Accordingly, and especially because of all the variables that exist with regards to vehicles in terms of both locality and usage, it is useful to monitor both sides of the data (input and output) to ensure that there is some level of maintained-consistency that reflects the state of things when the model was actually trained.

Fortunately, vehicles in the illustrative examples are capable of self-monitoring, not relying on cloud-based monitoring, which would require massive cloud compute if tens of millions of active models were to be monitored against live data continually. Using feature/model owner defined configuration data, which can help determine what represents an actual aberration or training opportunity, from the perspective of the creator, the vehicle can actively monitor its own specialized models and self-identify when a model would benefit from training or reversion.

Figure 3:
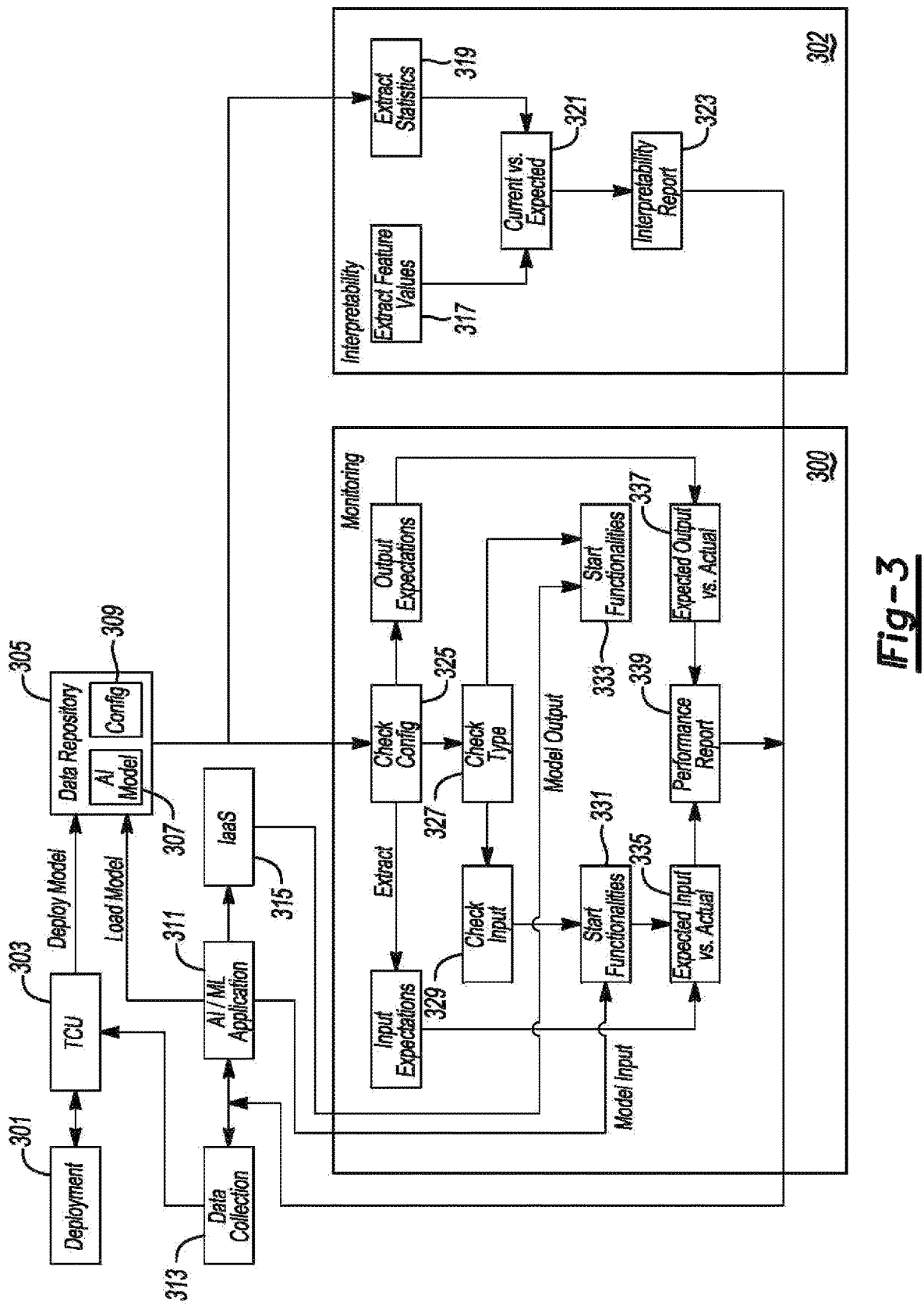
FIG. 3 shows an illustrative example of a continuous monitoring process and flow.

FIG. 3 shows an illustrative example of a continuous monitoring process and flow. An initial AI/ML model may be designated for deployment 301 from the cloud, which can include sending a copy of the model to a vehicle 100 telematics control unit (TCU) 303. The model may include the code necessary to execute the model 307, as well as a configuration file, which can defined, for example, any data necessary to utilize the model and/or train the model, expected inputs, labeling parameters, expected outputs, thresholds for training, thresholds for reversion, etc. The TCU deploys the model to the data repository, where it can be used by the vehicle 100 for its intended purpose.

When executing, the AI/ML model 311 loads the model from the data repository, an example of which is provided hereinabove with regards to discussion about the model repository. Data collection 313, pursuant to the configuration file defining what data is needed, receives instructions from the configuration file and provides the requested data back to the AI/ML application. The data can also be sent to the TCU 303, for redistribution back to the cloud 130. This data can be used for learning in the cloud. The AI/ML application also sends requests to Inference as a Service (IaaS) 315, which helps provide the output for the model.

Continuous monitoring in this example includes both monitoring 300 and interpretability 302. The interpretability extracts feature values 317 from the AI model as well as feature statistics 319 from the configuration file and compares the current feature values achieved through execution of the AI model with the expected values obtained from the AI model 321. These can be, for example, features that contribute the most to predictions made by a model. The model may have expected values for these features and the configuration file may have expected statistics for these features. The interpretability function 302 may extract the values for the features during model runtime and compare them to the expected values. A feature owner, for example, may define thresholds for features and which features provide the most contribution, which can be used in interpretability to determine one or more features' affect on an outcome. For example, the features from pixel values in an image can be extracted out as a vector of numerical values. That vector is a low-level representation of the image. Certain indices can be critical to predictions and the values at those indices would contribute the most to model predictions. A configuration file can define the relevant contributions.

This information is used to create an interpretability report 323, which identifies which features lead to incorrect predictions, or predictions that are out-of-range of any acceptable deviance. The interpretability report can be delivered to both the cloud and a model owner. Meta data associated with the model and saved in the repository may defined which entities are to receive copies of which reports, and how frequently and/or under what conditions.

The monitoring process 300 checks the configuration file 325 for a model type and input/output expectations. This check can include verifying that the model type (e.g., regression, classification, etc.) is supported 327 and that the model input (e.g., numerical, images, etc.) is supported 329. Once this has been verified, the corresponding model functionalities may be started 331 to receive the model input from the data collection. The corresponding processing functionalities may also be started 333 to process the incoming data to produce results (output) in accordance with the functions of the model responsive to the received input.

While the model is receiving input and processing output, the monitoring process can continually check the input 335 and output 337 against the expected values obtained from the configuration file. Thus, if the model is producing unexpected output, the monitoring process may be able to identify unexpected input as being or not-being a possible cause. Similarly, if the model is experiencing unexpected input, the monitoring process can determine if this is or is not changing the output values outside parameters. By including both expected results and tolerances/thresholds, the model owner can define what does or does not constitute unacceptable data, which allows the vehicle to identify opportunities for model improvement or reversion. The results of the analysis performed by the monitoring can be consolidated in a performance report and distributed 339 to the cloud and/or model owner.

Analysis over input and inference cycles can be continual and can include comparing historical distribution data (provided by the cloud) to historically used data, which may be stored onboard. This will reveal if the locally observed data matches the expected historical distribution over a wider range, and the local data will also be shared with the cloud to update the expectations and historical distribution. Since the data is actually being observed, it may not be "wrong," but it may represent an opportunity to train a model with different weights if the data is skewed (based on observation) relative to what was expected (based on a longer term observation). For example, with regards to something like environmental data, recent skew may represent a change of seasons or a move of the vehicle to a different climate, which may affect services related to HVAC and other user-centric recommendations, as well as active system controls and feedbacks.

If the feature owner provides an updated dataset distribution resulting from training in the cloud, the vehicle may compare the local training set to the updated set. This can reveal an opportunity to refresh the local training data, gather additional data or reweight the gathered data. Drift in the data can help identify a circumstance unique to the vehicle or an expectation that may have been improperly set (or which no longer applies). Configuration file "alarm rules" and thresholds may define when the drift is considered significant for a given model and/or when to alert the feature owner, when to train the model and/or when to revert to a previous version of the model, for example.

Before a model is deployed, a model owner may create distribution expectations about input for a model, which can be derived from the training set. Similarly, distribution expectations about the output may be created, and the expectations and a model type may be saved in a configuration file that is distributed with a given model. The methods (e.g., math, logic, etc.) used to calculate the expectations may also be provided so that a replica of those methods can be used by model monitoring.

For example, a traffic sign classification model may take images of a traffic sign as input, with the expected output that specifies a type of sign (stop, speed limit, street, etc.). Monitoring can track the confidence score coming out of the model, for example, an expectation that the confidence be higher than 70%. In one example, if a certain number of images in a row are predicted with confidence scores lower than 70%, this can trigger an alert and identify an opportunity to evaluate the model further and/or train the model. Evaluation may result in regression, at least temporarily, if the present model is unsatisfactory.

Figure 4:
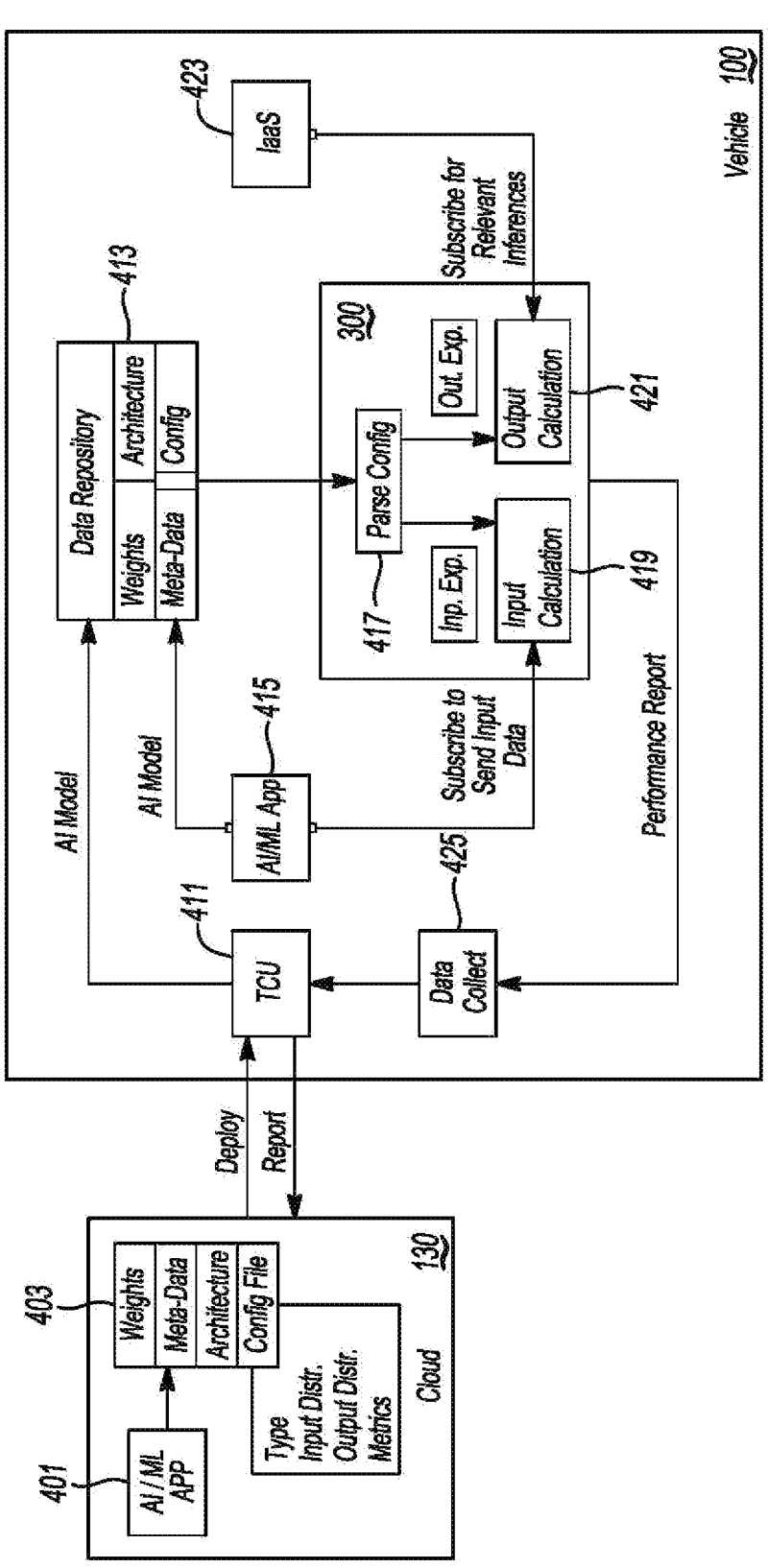
FIG. 4 shows an illustrative example of an interface analysis of model monitoring.

FIG. 4 shows an illustrative example of an interface analysis of model monitoring. The cloud 130 stores at least a generalized version of a model or application 401. Data 403 can include, for example, weights, architecture, metadata and a configuration file. An example configuration file 405 may include, for example, type of model, input distribution, output distribution and metrics for evaluation.

The model 401 is deployed from the cloud to the vehicle 100 via, for example, the vehicle 100 TCU 411. The TCU saves the model 401 to the data repository 413, which can include saving the corresponding weights, meta-data, architecture and configuration file as previously noted. The application 415 loads the model from the repository 413, subscribes to the required data as noted by the configuration file or elsewhere in the model. Model monitoring 300 obtains the expected values from parsing the configuration file 417 and thus obtains expected input and expected output distributions.

Monitoring may also subscribe to the input data stream to obtain the live input data for use in a comparison to the expected distributions, as well as subscribing to IaaS 423, which will provide the output of the model based on the live input data. This information can be used to compare real output distribution to expected output distribution 421. Based on the comparisons, the process 300 may pass a report to data collection 425, which can report the performance to the relevant parties (e.g., those required by the meta-data or other parameters defining reporting).

As discussed briefly hereinabove, inference as a service (IaaS) is a function that may be included in the illustrative framework. An inference is, for example, the result of any computation, statistical calculation or output of an AI/ML model. IaaS is a publication of inferences to which clients can subscribe. The AI/ML framework provides a set of functionalities that may enable sharing the inferences or computation output across multiple entities under particular conditions, in accordance with service oriented architecture (SOA).

The IaaS layer may include, for example, a standard and future agnostic method of publishing inferences to the SOA. Functionalities to convert compute output to compute input—converting inferences on SOA to input. Common functionalities to run predictions. This strategy may benefit from a generic interface structure to be published and identification of in what service interface inferences are to be published.

Service elements may include fields that have, for example, a most-recent inference value, model metadata, indications for whether inferences are actively published, debug and other additional information. The service elements may also handle methods to activate and deactivate inferences when the inferences are controlled by clients, for example.

The platform may provide common functionality to convert between output/input and inferences-over-SOA. For example, for a common kernel used for prediction, the platform may provide a common code to extract data from the kernel output and publish the data over SOA. For scenarios where SOA inferences are used in further computation (e.g., inter-SOC computation), the platform may provide common code allowing the use of the inference in computation. For example, if a region of interest (ROI) is detected and published over the SOA, it may also be needed for cropping input to another model. The ROI can crop around any pixel or pixel group, and the ROI may be of interest to more than one model. The platform could then provide an SOA subscriber OpenVX kernel that will feed ROI to the rest of the OpenVX pipeline. That would represent a valid inter-SOC pipeline. Or, for example, when inferences are fused to provide an inference with improved prediction or a better confidence estimation.

In general, running an inference computation and publication of the resulting inference may be determined by various factors. These can include, for example, when an inference stream has to be active. That can be determined by various previously set scenarios such as when a use case is active, a state of the vehicle, repeated requests from features, etc. A triggering condition may define what particular condition triggers individual computation and publication of an inference on the SOA when the use case is active. Input data may define what data should be fed into the computation kernel as inputs. Type of kernel may define what prediction function is used to obtain a given inference. A given model may define the parameters/coefficients/weights (e.g., trained) are to be used in the prediction function.

A data broker may support evaluation of the "when," triggering condition and input data considerations in the preceding example, as these factors may be similar to the factors that drive data collection. The other example conditions, type of kernel and trained model, may be stored in a data repository as they are likely AI/ML specific to a given model.

Use cases may include, but are not limited to: completely custom code to collect and preprocess data with a custom model that can use the standard IaaS structure to publish a resulting inference on the SOA; use of data-intent or pre-defined triggers to run a prediction process and publish the inference using a standard structure; or requests from features to kickstart a prediction process and publish the inference in a request-response fashion.

For example, a Diesel Particle Filter monitor may include Diesel Particle Filter prediction. This model's kernel and coefficients may be black-box C code produced in MAT-LAB. The logic to accumulate the data, run preprocessing and even the model may be highly customized, and so unable to rely on standard kernels to execute. The results (the inference) can still be published using the standard structure and service, however.

In another example, backup assist may be a use-case where inputs are well defined as, for example, a node in an OpenVX graph and a few standard signals. These inputs may be shared with many other models. The inference is needed as soon as a vehicle is in a certain state and for each frame, and the kernel may be highly standardized. For scenarios such as this, the architecture may support deployment with minimum or no use-case inference production code. Platform code may be configurable with the state condition, references to image and signal input and the desired model (kernel and coefficients).

Output of IaaS could be converted to several forms, one for publication in a standard SOA format, which allows, for example, for binary output to be converted to SOA format using a custom kernel. Another conversion may include conversion of IaaS output to kernel input for further computation. Further, it may be useful to publish translated output (from IaaS) as instances on the SOA for multiple client to subscribe.

In a general example, IaaS may receive a request from an AI/ML application owner and kickstart the computation graph by requesting a Compute as a Service module. IaaS may then reply back to an application owner with the inference stream topic identifier and may provide a computation graph identifier as an acknowledgement to the request. Based on the identifier received, the application owner can subscribe to the inference topic and request the computation graph for any custom preprocessing of the data. The request sent to IaaS from the application owner may include the model required to run, input data required and custom trigger details, if any, based on which the data is subscribed from data broker. The model may be loaded by a request to the model repository from persistent memory for computation purposes. Once the input data and model is ready, or based on the trigger, the inference is computed and published onto SOA by IaaS. The computation may be carried out in a loop, based on the trigger request time limit or until conditions are met to stop, for example, after which clean-up of memory can be carried out.

Figure 5:
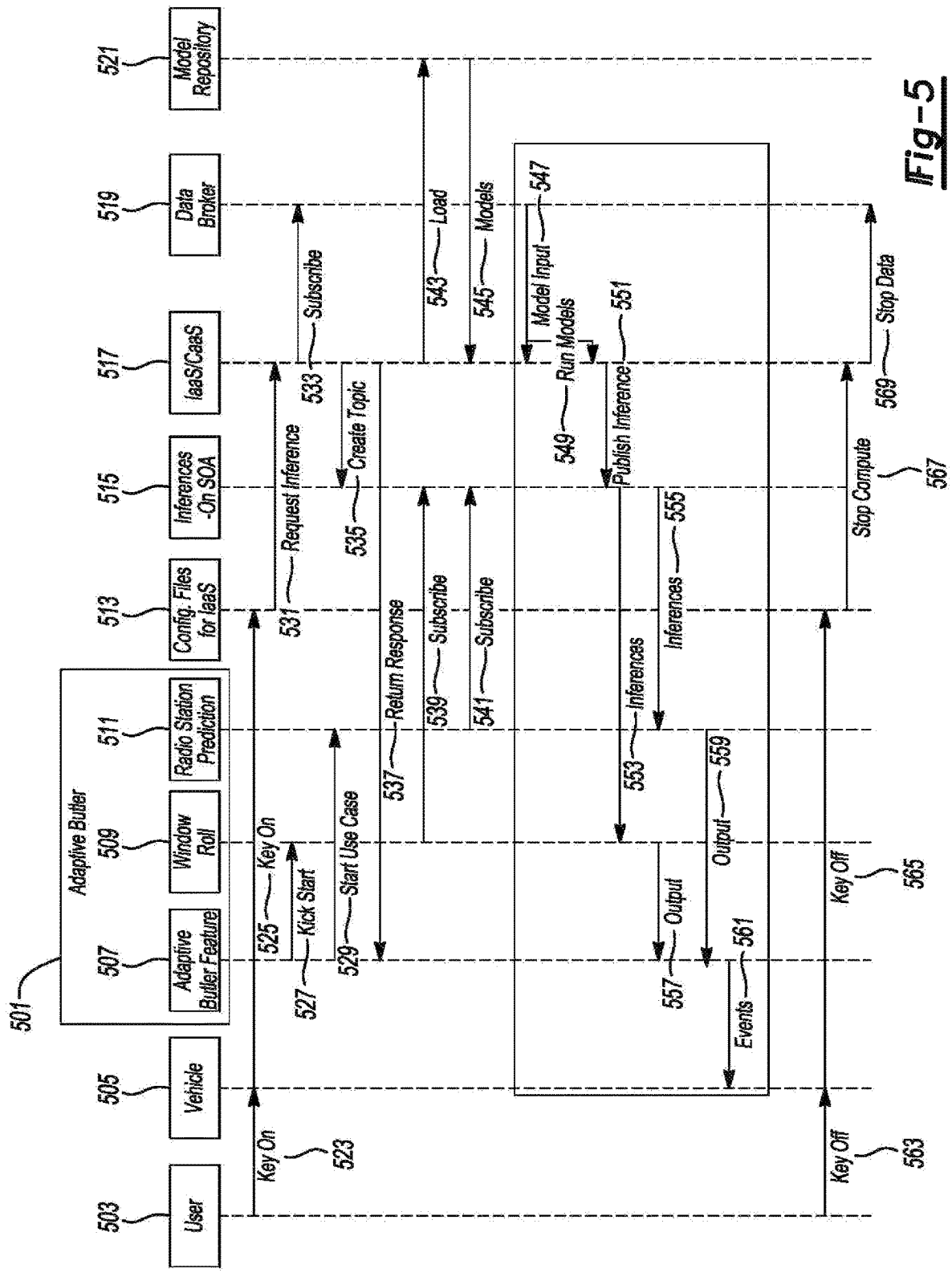
FIG. 5 shows an illustrative example of inference as a service (IaaS)

FIG. 5 shows an illustrative example of inference as a service for a possible ML application. The application 501 may be executed when a user 503 turns on an ignition at 523, which signals a vehicle 505. The user may be identified in some manner (as this may be a personalized function in this example) and that id and the key on signal can be passed to configuration files for IaaS 513, which may be loaded upon key-on.

The configuration files dictate that a trigger signal cause a request for an inference at 531, which may also include any relevant data for the request, such as, but not limited, the ID, model ID, trigger details, etc. That request is passed to IaaS/CaaS 517 which (as it will be doing the computing on the model) subscribes at 533 to input data and trigger parameters, so IaaS will both know when the model is triggered and have the relevant data to execute the model. The subscription here is to the data broker 519. IaaS/CaaS 517 also creates an inference topic on SOA 515 to which modules and features can subscribe, which in this example will be window roll 509 and radio station prediction 511 features of an adaptive window butler 507 package.

IaaS/CaaS also returns a response to the initial request from the configuration file at 537, which can include identification of what inference topics were created, so that window roll 509 can subscribe at 539 and radio station prediction 511 can subscribe at 541. The feature 507 may also have stated use cases of both the window roll at 527 and the radio station prediction at 529 so that those features are active and can subscribe to the relevant inference topics.

IaaS/CaaS loads the model(s) for the user at 543, which for a preference prediction model (window roll, radio) may be user specific, or potentially regionally specific or demographically specific. The model repository 521 returns the model at 545.

The Loop, which can be based on a trigger, activates the model(s) to produce inferences usable by the various features. Once a trigger occurs (temperature, precipitation, time of day, etc.), the model(s) receive input from the data broker 519 at 547 and 549 and execute the models using the data. Relevant data for each model may be (and in this case likely is) different, although certain weather data, for example, may be pertinent to both, if it affects window position and driver mood producing different radio station selection.

IaaS/CaaS 517 publishes data on the SOA 515 at 551 to the created topics. The window roll accesses its topic data (to which it is subscribed) at 553 and the radio station prediction accesses the data to which it is subscribed at 555. Outputs from those features, based on the inferences, are passed to the butler at 557 and 559, and the butler feature 507 can control the window or radio accordingly. While the vehicle 505 travels, the butler notes events at 561 that may trigger another inference and the loop can continue. When the user 501 turns off the vehicle 505 at 563, this key-off is passed to the configuration files at 565, which may instruct compute to stop at 567 and data to stop at 569.

Model monitoring can also consider the inferences and confidence levels and, using values indicated in the configuration file, for example, determine if a model is ready for training or in need of reversion.

Figure 6:
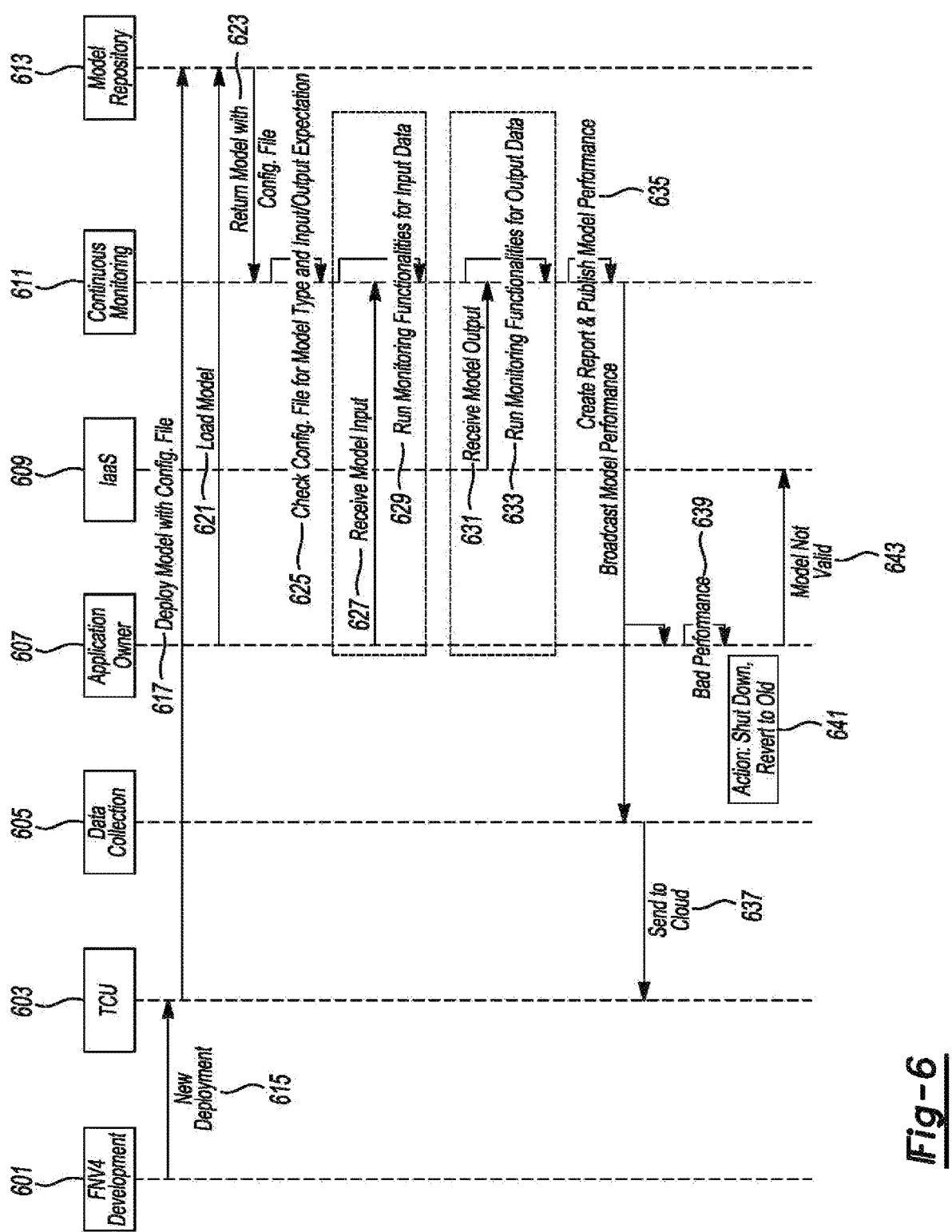
FIG. 6 shows an illustrative example of model monitoring.

FIG. 6 shows an illustrative example of a monitoring process for a newly deployed model. A developer 601 prepares a model that is vetted and ready for deployment, and that new model is deployed at 615 by sending it to a vehicle TCU 603. At an appropriate time, the TCU 603 stores the model at 617 in a model repository 613 onboard the vehicle. The vehicle now has a working, accessible version of the model stored onboard.

When a feature or process calls/loads the model at 621, the model is loaded at 623 from the repository 613 and output from the model is provided to the model monitoring process 611. This allows the vehicle to continually monitor the model while it is being used. The config file associated with the model defines when an input or output is out of bounds or represents an opportunity for improvement. The monitoring process checks the config file at 625, having been loaded with the model to the monitoring process 613.

The model is also subscribed to the appropriate data, and so model inputs are received at 627. While the model uses those inputs in accordance with its present form to produce results usable in the vehicle, the monitoring process 613 also checks the input data against the expectations from the configuration file. The model further produces the output requested by the feature calling the model produced by IaaS 609 called by the model in conjunction with CaaS. This output is also received at 631 by the monitoring process 613. That is, while the feature uses the output to perform its function, the monitoring process also receives the output to check the output against the expectations at 633 included in the config file. A model owner can define these expectations and/or redefine these expectations as the model evolves, with redefinition achieved by loading a new config file to the model repository.

Using the comparison of the inputs and outputs against the expectations, the model monitoring process 613 creates a performance report at 635 and publishes it for any subscribed entities. A copy of the performance report is received at 637 by the data collection process 605 which uses the TCU 603 to send the report to the cloud. The model performance may also be received by the application owner 607, which can use the information to determine if the config file, for example, needs updating or if the model is exhibiting bad performance at 639. Bad performance observations provide an opportunity to decide at 641 to revert to an old version of the model, which may be stored in the model repository 613. The IaaS 609 may also be informed of the reversion at 643 so that it can use the older version of the model.

Shadow mode can also provide similar utility, running a new (but not deployed) version of the model against present inputs. Monitoring can review the inputs and outputs sent to and produced by the shadow version of the model, by comparing them to expectations and also by determining if the outputs, for example, represent "better" outputs than the presently deployed model is achieving. If that is the case, then the new model is both functional and improved (the monitoring process can also validate that the new model is not producing out of bounds or erroneous results, again, based at least on the config file defining the parameters for both improvement and error).

Deployment of an improved model, from the cloud or based on an online (in-vehicle) learning process, can include dependency checks for the target environment. Further, the prior (working) version of the model can be saved in the model repository in case future inputs result in bad model performance. Observation of bad performance, which may not have been apparent based on the data used to vet the model originally, can result in rollback to the older, previously-working version.

When all dependencies have been checked and any authentication has been performed, the deployment process may also determine a vehicle state before deployment, as the vehicle may be required to be in certain states (e.g., powered mode, key-off mode, motive mode, sleep mode, charging mode, etc.) prior to deployment of a new model. When necessary, customer consent (via the vehicle or an application interfacing with the vehicle) can also be obtained. If the new model came from the cloud, it may first be deployed to a shadow mode for a given vehicle in order to vet the model using live data from the vehicle before live deployment. The vehicle, when appropriate, shall make the newly deployed model the currently-functioning model, but the model monitoring process will continue to observe the model over time in case reversion or training is needed.

Models in the illustrative embodiments may be trained through at least two techniques, referred to as federated and/or online learning. Online learning is the live improvement of a model onboard a given vehicle, wherein the model is trained over time because of relevant observations and inputs made by the vehicle. This is both an efficient usage of compute resources (leveraging the vehicle computer) and allows models to be trained for a given vehicle. Since vehicles experience wildly different variables in virtually all facets of observed and gathered data, as well as usage, initial models may evolve very differently for different vehicles used in different contexts by different users.

For example, one user may drive a vehicle lightly in weather that is always above 60 degrees F. and observe virtually no traffic. Another user may drive the vehicle with heavy loads, hundreds of miles per day, in heavy traffic in an environment that changes aggressively with the seasons. The vehicle itself may be designed for either (or neither) usage specifically, but models evolution in accordance with context (who, what, when, where, why and how) can produce models that achieve a given objective for each user that results from the context. Either model installed on the other vehicle may be inappropriate (from an input and/or output perspective) for the respective other vehicle, but may eventually be highly suited for the context of the vehicle on which it evolved. Accordingly, online learning allows for efficient compute utilization and context-relevant evolution without having to have massive cloud-compute and significant ongoing data transfer and high expense and bandwidth usage as the cloud attempts to continually evolve ten million versions of a model based on specifically observed circumstances on a per-vehicle basis.

While it may be the case that models adapt to a vehicle, the online learning process also provides a substantial source of input for federated learning. That is, as models evolve, common themes and improvements that may be useful across many vehicles may emerge. Instead of ingesting all the data in the cloud, the evolved models themselves can be used to evolve a global model that at least can be adapted in the ways that appear to represent common improvements for all vehicles or select, but large, subsets of vehicles. Thus, when a new vehicle receives the global model as a baseline, it has a better version of the model than originally devised. Similarly, vehicles that are experiencing slow or no evolution of the model (e.g., limited inputs and usage) can receive updated model versions without having to evolve the model onboard. Moreover, some vehicles may incorrectly or badly train a model and may directly benefit from federated learning by being taught (via deployment of an updated global model) the thing(s) that those vehicles should have learned or would likely have eventually learned.

Both online learning and federated learning can be used to update some or all vehicles. Online learning as a global source may be useful for vehicles under similar context—e.g., similarly used vehicles operating in similar environments, which may be especially true, for example, if a fleet owner simply expands their fleet, doubling the count of each vehicle and intending those vehicles perform similar services under similar conditions to their previously-existing counterparts. Instead of having to wait for all the new vehicles to learn what the already-existing vehicles learned, the online-learned models can be distributed to the corresponding and relevant new vehicles.

Federated learning, as noted, may be applicable to all or a subset of vehicles. Accordingly, federated learning can be used to update a version of a model that also has context associated therewith—e.g., this model is "better" for vehicles under this context. In other instances, federated learning may simply reveal a better aspect of a model that is globally applicable and can be used in all instances as an improvement to the global model. Cloud-based repositories of information can track every deployed version of every model for every vehicle, if desired, including what was changed, when it was changed, what new model was deployed, etc.

In one example, online learning is categorized as three possible scenarios, for illustration. Light learning+light data (LLLD), light learning+heavy data (LLHD), heavy learning+heavy data (HLHD). LLLD can include, for example, learning algorithms such as linear/logistic regression or k-NN with small data. LLHD may include use cases that require feature extraction, dimensionality reduction, etc. and can be processed in an accelerated domain, while actual training/inferencing may be light. Training efforts may be the same as LLLD except that data will be streamed from data collection to the accelerated domain. HLHD may include Neural Network-based and some methods like SVM/Random Forest/K-NN that run directly in the high dimensional accelerated domain.

Figure 7:
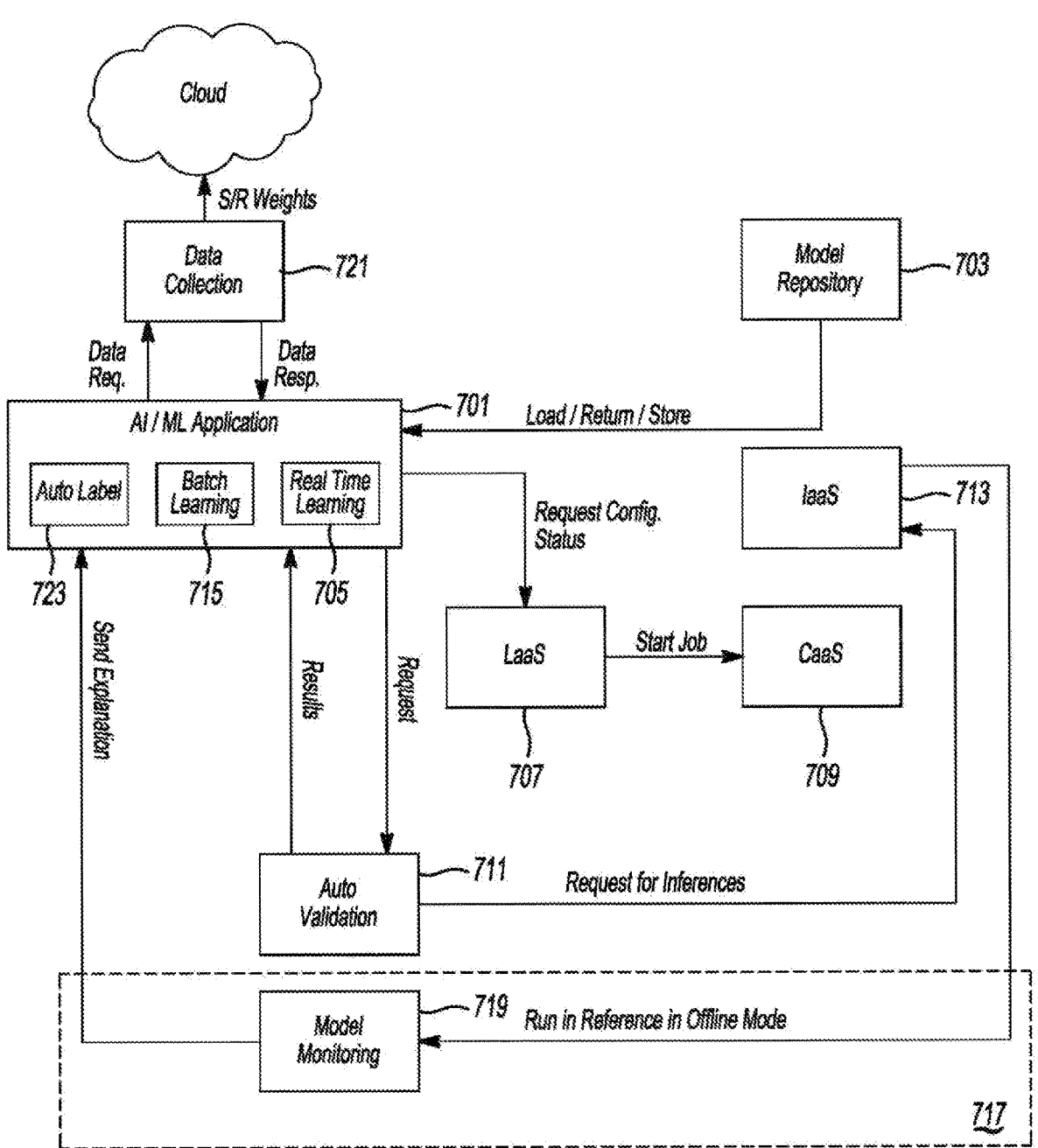
FIG. 7 shows an illustrative example of an online learning flow.

FIG. 7 shows an illustrative example of an online learning flow. In this example, an AI/ML application 701 may load a model designated for learning from the model repository 703. Real time learning 705 may include learning as data is gathered and can be configured for training and status monitoring actions. If an inference is wrong, real time training can occur. It can call LaaS 707 which will use CaaS 709 for training. Results of the training (a new model) may require validation, and so the AI/ML application can call an auto-validation module 711 that uses IaaS 713 and test inferences to determine the validity of the new model. Batch-based learning 715 may work in a similar manner, but may use saved data from prior observations to train the model based on a batch of data for which model monitoring suggested that better results may be obtained. IaaS may return the inferences and/or execute the model in shadow mode 717, which may involve model monitoring with consideration of interpretability of data 719. Newly tuned and/or validated models can have their weights sent to the cloud.

As the AI/ML model executes, it receives data from data collection 721 and an onboard process 723 auto-labels the data received from the vehicle. Labeling of data and auto-labeling is discussed in greater detail hereinbelow, however in general, data gathered by the vehicle is more useful to models and learning when it has some identification (label) indicating what it represents. This may often involve a human going through the data and appending labels, but waiting for that step may render online learning virtually impossible, and accordingly, the vehicle is equipped to automatically label the data in certain manners.

Training may begin when the AI/ML model decides that training is appropriate, which may vary from model to model and which may be defined, at least in part, in terms of appropriateness, by the config file for a given model. For example, if a model shows poor performance relative to expectations, training may be instituted.

Training data may be collected from the data collection module in response to a request, and this data may be auto-labeled by the auto-labeling module, to be used in training. The learning process may call LaaS, which uses the labeled training data and creates a graph (training binaries) to be used by CaaS, which may occur, for example, during vehicle off-time so as not to strain compute resources used by the vehicle while driving.

LaaS may monitor the training status using preconfigured thresholds (e.g., accuracy, loss) and may cancel training if reported accuracy and/or loss exceeds thresholds. The training progress may also be saved in case of the event of a training halt, such as operation of the vehicle. A newly trained model may be saved for validation.

Following validation, the new model is versioned and stored in the model repository. Further, once the model has been validated, but before deployment, the model inference can be tested in shadow mode mirroring the current model (except using the new model) and using live data as inputs. Interpretability from this optional step can provide an explanation of the internal behavior of the model, which may be especially useful if the model does not perform as expected.

Figure 8:
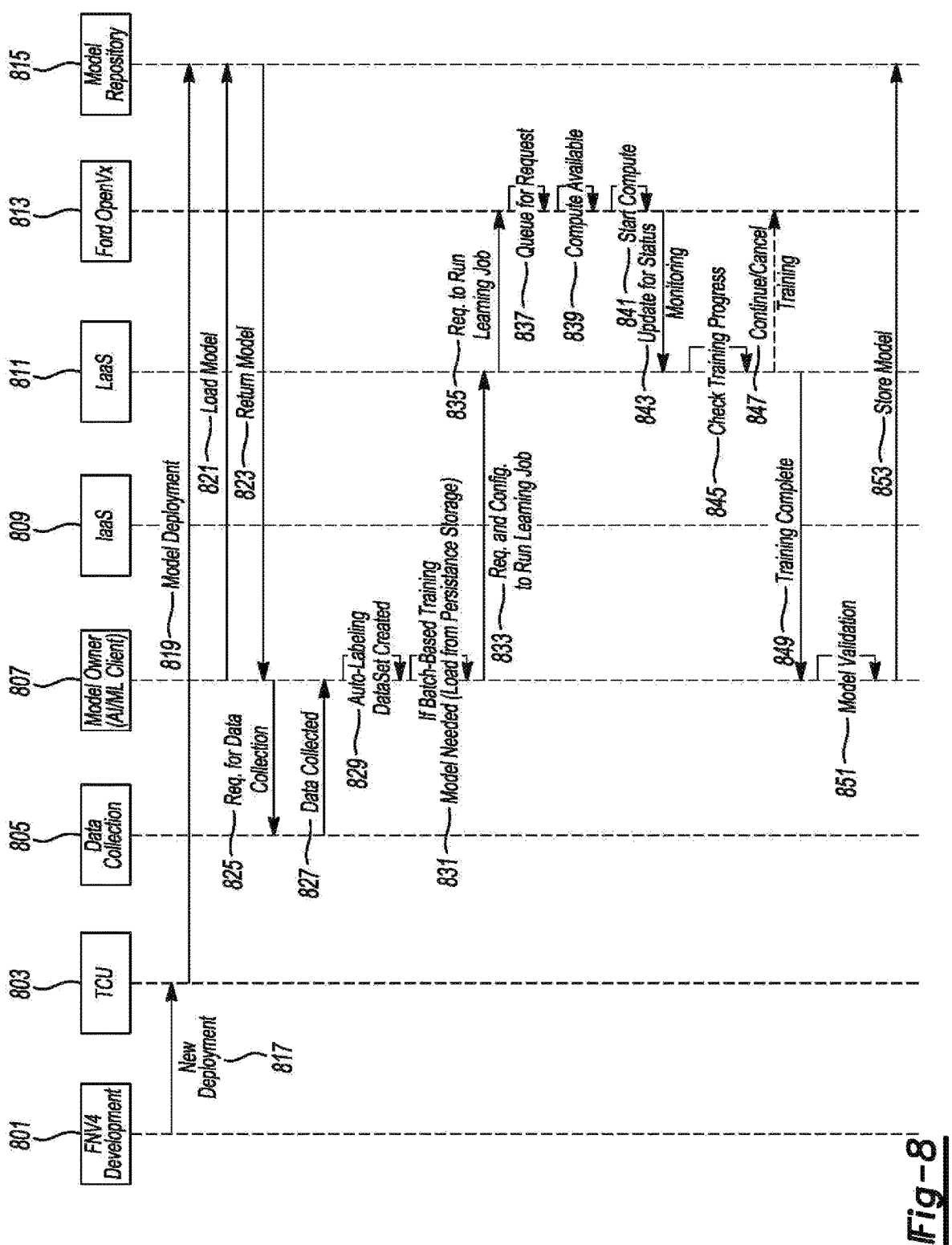
FIG. 8 shows an illustrative example of an online learning sequence.

FIG. 8 shows an illustrative example of an online learning sequence. In this example, a model is newly deployed at 817, from a developer 801 to a TCU 803. At an appropriate time, the TCU 803 stores at 819 the model in the model repository 815. When the model is ready for training, it is requested at 821 and returned from the model repository at 823. The training process may also request data at 825 from data collection 805. The collected data may be returned at 827 to the training process responsive to the request, and auto-labeling may label the data at 829. If batch based training occurs, prior data may also be loaded (already labeled) at 831.

Requirements and configuration for a learning job are passed at 833 to LaaS 811, which passes the requirements to the OpenVX 813 module. OpenVX 813 queues at 835 for an available compute job, and when compute is available at 837, the module starts the compute at 839 used for training. While training occurs, the status of the model is updated at 843 and the LaaS 811 process monitors the training at 845 as discussed above. The LaaS can cancel training at 847 for any appropriate reason, or the training completes at 849 and the model passes to validation at 851. Assuming the model validates, it can be stored in the model repository at 853.

LaaS may load and configured a Kernel based on a configuration defined by an application. For example, a Neural Network based learning process may provide Logistic Regression training, configuration for training an NNN classifier (&image, &label, batch) and a Tensorflow-TrainNNNRegressor configuration (&image, &label, batch). A Classical ML learning process may provide SVM Regression training, configuration for training a Random Forest Classifier and configuration for Markov Model training. Above, for example, the training may occur on a batch having images, with certain labels, in a batch of a certain size.

The LaaS implements a data accessor for the kernel based on configuration and hyperparameters, and interfaces with data collection to supply data to the selected kernel (directly or through a streaming graph). The dataset may be split into validation and training data, and the LaaS may interface with the Ai/ML application to receive a compute graph and submit it to CaaS. LaaS may further interface with CaaS to submit a graph with SOA nodes as input, SOA nodes as output and the supplied training kernel. The message from LaaS to CaaS may include a set of API calls provided by OpenVX standard, such as: Create Node, link nodes, validate graph, Execute graph/stream graph. Streaming may include repeated execution over streamed data provided by input nodes until training is done or cancelled.

As training progresses, the LaaS may receive progress logs and submit the logs to the Ai/ML application. Training progress and progress of the kernel may be exposed in an SOA compatible format and be exchanged between the CaaS and the AI/ML application. Any cancellation request from the AI/ML application may be passed from LaaS to CaaS, and the progress of training can be stored in case of cancellation or termination.

Federated learning can occur when one or more online learning updates result in newly valid models. The weights of the new model from each successful (or a subset of successful) online learning sessions can be shared with the cloud, which can modify the global model based on those online learning sessions. Data used to train the individual models can be obtained from the respective vehicles.

Auto-labeling is the process of automatically annotating data, e.g., adding metadata, with minimal or no active human intervention. When a vehicle Ai/ML model is going to be trained on a vehicle, it will often be with live or recently-gathered data. This means that the data cannot go through a traditional process of a human reviewing the data and deciding how to label the data. Accordingly, it may be useful to have a module onboard the vehicle that can both label the data and append labels that render the data useful for a given subscriber. That is, not only can the data be labeled, but it can be labeled with relevant context based at least on one or more subscribing AI/ML models, for example, so that the labels render the data useful for the subscribing model used to label the data.

Several illustrative examples demonstrate various non-limiting examples of types of labeling that can be used in this context. In sensor derived auto-labeling, a sensor annotates the data. For example, an image may have an acceleration label associated therewith, and a sensor may provide an inertial measurement in order to assist in labeling this data. In human derived auto-labeling, a human input can be used in conjunction with the data labeling, to either directly or indirectly label the data. Indirect auto-labeling includes annotations indirectly accessed based on human interaction, and direct auto-labeling includes annotations that are directly access based on an intentional interaction with a human. Algorithm derived auto-labeling uses an algorithm to label data, and synthetic data may be used where annotations are generated via generative CL algorithms such as GANs.

Auto-labeling can be used in several contexts, including, but not limited to: increasing cloud workflow—where precision (a human) labeling is required, the auto-labeling of gathered data to later be human labeled can improve the throughput and initial sorts; in online learning, data not requiring human labeling can be gathered and labeled for use by online learning without involving a human labeler in the process at all; and identification of a dataset as a cluster of users—for example, when data requiring hyperlocal knowledge is required, such as lane centering to adjust a vehicle to a corner of a lane when passing a large vehicle, auto-labeling can label data showing where a vehicle is relative to a lane marker. This can assist in determining group preferences (location relative to lane across a group) and individual preferences (where within a lane a given driver prefers to drive). More driver personalized data may include, for example, steering wheel angles achieved by the driver as the driver drives within a lane.

The mechanism for auto-labeling may fall under the purview of an AI/ML application owner, since auto-labeling may be specific to a given use. That is, the configuration file for the AI/ML application can define how certain data is to be labeled. An example of this follows.

An AI/ML application owner may monitor the performance of the application based on key performance indicators (KPIs) provided by model monitoring, and implement logic to determine if auto-labeling is required based on the KPIs. The AI/ML application owner can identify the data required for a data set creation (e.g., subscriptions to various vehicle data, timing, scope, etc.). The owner may then implement the logic required for the creation of the dataset, that is, the logic required to assign a label to the data. Data collection saves the generated dataset to persistent memory and the AI/ML application owner may configure data collection to do this step and to provide some dataset cleaning utilities to remove ancillary data not needed by the particular model. Based on input data, the AI/ML application owner generates the dataset and publishes it, data collection reads the dataset and saves it to persistent memory, and data collection may perform data cleaning on the saved data. This process may continue until there is a trigger for a stop, provided by the AI/ML application owner or the vehicle platform, for example.

An illustrative auto-labeling sequence may consist of three parts—initiation, loop and trigger/stop. Initiation is the decision of the AI/ML application owner in this example, and includes a request to data collection that configures data collection to set up publishers and subscribers on the data collection and data architecture. The AI/ML feature owner may then subscribe to input data and process it to generate a dataset. The AI/ML application may then publish the dataset and data collection can subscribe to this dataset. The subscribed data may be then stored to persistent memory per the configuration above. At some point, triggers may indicate cessation to data collection and this will close the publishers and subscribers. Data collection may then provide a short summary of the data collected—e.g., size, samples, etc.

In one example, an attachment angle data (derived from images of an attachment) can be auto-labeled using synthetic data via generative machine learning. Inputs to the labeling process may include an image of an attachment collected in real-time, as well as a reference image with a known attachment angle. The GAN process produces a rendered image wherein the input image is rendered in the form of the reference image, as well as an attachment angle for the rendered input image. This data, which is the rendered image, is now labeled with a reference angle and can be used for training, online learning, analysis, etc., but no human had to measure the angle or contemplate the image.

In another example, an adaptive butler process can learn based on human reactions to "suggestions" whether to label a suggestion as a valid or invalid suggestion. Inputs in this case can be an ID of the human supplied by the AI/ML owner, a location (GPS) supplied by a CAN signal, a timestamp supplied by data architecture, an applicable time zone supplied by the AI/ML owner, a GPS track that shows historical position data supplied by the CAN, events that are voice commands to interact with the feature and vehicle speed supplied by the CAN. The result will be a suggested window position that is attempting to put the window in a correct position as desired by that person at that time under those circumstances.

The application may monitor the performance of the deployed model using model monitoring. Model monitoring provides the application the following metrics: True Positive (TP), False Positive (FP), True Negative (TN) and False Negative (FN). Misclassifications refers to incidences of False Positives and False Negatives. Once misclassification is identified, the signal data is collected using FNV4 Data Collection scripts. The resultant data is labeled with whether or not the signal (window position) was accurate or not, which can be thought of in one example as instances where the human left the window unchanged or manually changed the window following suggested positioning. This is an example of indirect labeling. Direct labeling may be, for example, asking the human if the position was a correct one. Among other reasons to train, false negatives and false positives may indicate opportunities for training the model.

In addition to learning online, the vehicle may benefit from being able to validate newly proposed or improved models. Simply because a model was trained does not mean that it results in a smarter model. Before deployment as the functional version of a model, the vehicle may validate the model, which may avoid having to send the model to the cloud for validation (even though the cloud could later attempt to validate the model with a much larger data set from many vehicles).

Shadow mode is useful for validation, in that it can benchmark both the prior/current model as well as a newly tuned model using the same live data. That is, without deploying the model, shadow mode can effectively run both versions on live data and determine which model is performing better. An AI/ML application owner can define what constitutes an improved model in the configuration file (metrics) as well as provide instructions as to whether or not to append training data to a validation set.

Figure 9:
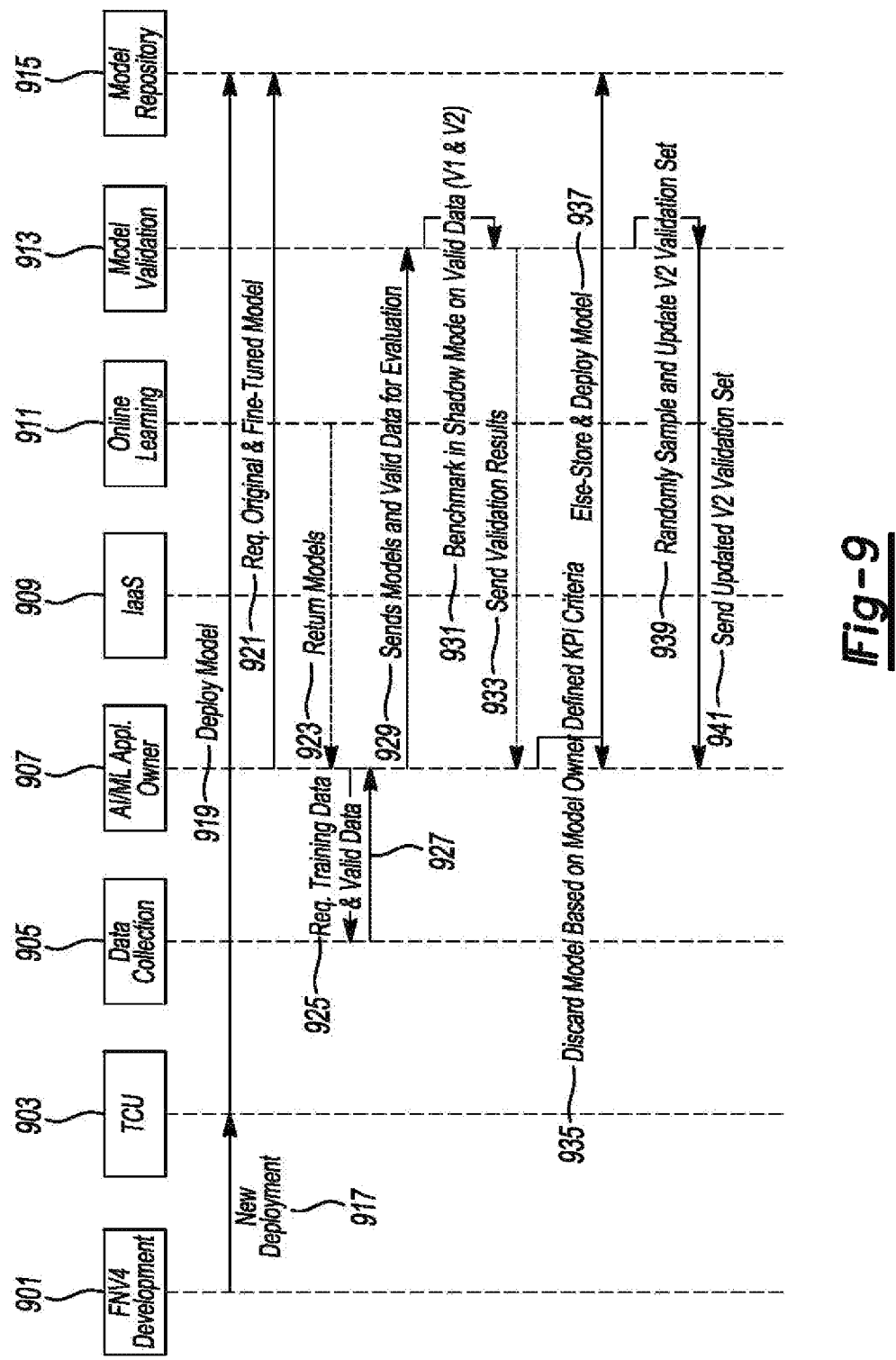
FIG. 9 shows an illustrative example of an auto-validation sequence.

FIG. 9 shows an illustrative model validation sequence. As in prior instances, a new model may be deployed at 917 from the cloud 901 to the TCU 903 and eventually be saved at 919 to the model repository 915. When shadow mode is attempting to validate a newly trained version of the model, the application owner can request at 921 both the original and tuned models. This may include a subscription to the online learning module 911, since a newly trained model may not be saved in the repository until after validation. But with the owner 907 subscribed to online learning for the model, it will be able to receive at 923 the tuned version of the model as training is completed.

The owner may then request at 925 both training data and/or valid data from data collection 905, which returns valid data at 927. This data and both versions of the model may be sent at 929 to the validation module 913, which can benchmark both models at 931 using the data provided. Validation results are sent at 933 back to the owner, where, based on the KPIs indicated in the configuration file, the owner can dictate either discarding the new model at 935 or storing and deploying the new model at 937. Validation data may include owner defined validation data and randomly sampled validation data. The model validation process may further randomly sample available data and updated the second validation data set at 939 and send at 941 this information back to the model owner.

Some models may be validated onboard and other models may not. For example, informational models, such as window position prediction may be suitable for onboard validation. On the other hand, certain security/privacy related features may be validated offline (in the cloud).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:

one or more processors of a vehicle configured to:

receive first identification of data to be gathered, via a request configured based on a configuration file associated with a machine learning model stored by the vehicle;

receive second identification of how the data is to be labeled, based on at least metadata, defined by the configuration file;

gather the data identified by the first identification;

create one or more topics for publication of the gathered data, onboard the vehicle;

publish, to the one or more topics, both the gathered data and the metadata usable to label the gathered data in accordance with second identification defined by the configuration file, as published data;

subscribe to the topics to receive the published data and the metadata;

append labels to the data, using the metadata, to label the data in accordance with the second identification of how the data is to be labeled defined by the configuration file; and save the labeled data in vehicle memory as data associated with the model.

2. The system of claim 1, wherein the metadata includes vehicle sensor data published to the topics in conjunction with the data gathered pursuant to the first identification and designated, by the configuration file, to be labeled based on one or more sensor values present at the time the data was gathered.

3. The system of claim 1, wherein the request includes timing for gathering of the data, the timing defined by the configuration file.

4. The system of claim 1, wherein at least one of the one or more processors is further configured to remove data from the gathered data that does not correspond to a region of interest in the gathered data, the region of interest defined based on the configuration file.

5. The system of claim 1, wherein the metadata includes identification of a positive or negative response by a human occupant, responsive to a vehicle state change action generated based on the model and the positive or negative response indicating whether the vehicle state change was accepted or modified, respectively.

6. The system of claim 1, wherein the metadata includes a response to a query asked directly, via a vehicle display, of a vehicle occupant, the query defined by the configuration file.

7. The system claim 1, wherein the configuration file defines an algorithm usable to modify the gathered data to produce a modified version of the gathered data and to determine a characteristic of the gathered data, used for labeling the gathered data, based on the modified version of the gathered data.

8. A method comprising:

receiving first identification of data to be gathered, via a request configured based on a configuration file associated with a machine learning model stored by a vehicle;

receiving second identification of how the data is to be labeled, based on at least metadata defined by the configuration file;

gathering the data identified by the first identification;

creating one or more topics for publication of the gathered data, onboard the vehicle;

publishing, to the one or more topics, both the gathered data and the metadata usable to label the gathered data in accordance with the second identification defined by the configuration file, as published data;

subscribing to the topics to receive the published data and the metadata;

appending labels to the data, using the metadata, to label the data in accordance with the second identification of how the data is to be labeled defined by the configuration file; and saving the labeled data in vehicle memory as data associated with the model.

9. The method of claim 8, wherein the metadata includes vehicle sensor data published to the topics in conjunction with the data gathered pursuant to the first identification and designated, by the configuration file, to be labeled based on one or more sensor values present at the time the data was gathered.

10. The method of claim 8, wherein the request includes timing for gathering of the data, the timing defined by the configuration file.

11. The method of claim 8, further comprising removing data from the gathered data that does not correspond to a region of interest in the gathered data, the region of interest defined based on the configuration file.

12. The method of claim 8, wherein the metadata includes identification of a positive or negative response by a human occupant, responsive to a vehicle state change action generated based on the model and the positive or negative response indicating whether the vehicle state change was accepted or modified, respectively.

13. The method of claim 8, wherein the metadata includes a response to a query asked directly, via a vehicle display, of a vehicle occupant, the query defined by the configuration file.

14. The method of claim 8, wherein the configuration file defines an algorithm usable to modify the gathered data to produce a modified version of the gathered data and to determine a characteristic of the gathered data, used for labeling the gathered data, based on the modified version of the gathered data.

15. A non-transitory computer-readable storage medium storing instructions that, when executed by one or more processors, cause the one or more processors to perform a method comprising:

receiving first identification of data to be gathered, via a request configured based on a configuration file associated with a machine learning model stored by a vehicle;

receiving second identification of how the data is to be labeled, based on at least metadata defined by the configuration file;

gathering the data identified by the first identification;

creating one or more topics for publication of the gathered data, onboard the vehicle;

publishing, to the one or more topics, both the gathered data and the metadata usable to label the gathered data in accordance with the second identification defined by the configuration file, as published data;

subscribing to the topics to receive the published data and the metadata;

appending labels to the data, using the metadata, to label the data in accordance with the second identification of how the data is to be labeled defined by the configuration file; and saving the labeled data in vehicle memory as data associated with the model.

16. The storage medium of claim 15, wherein the metadata includes vehicle sensor data published to the topics in conjunction with the data gathered pursuant to the first identification and designated, by the configuration file, to be labeled based on one or more sensor values present at the time the data was gathered.

17. The storage medium of claim 15, wherein the request includes timing for gathering of the data, the timing defined by the configuration file.

18. The storage medium of claim 15, further comprising removing data from the gathered data that does not correspond to a region of interest in the gathered data, the region of interest defined based on the configuration file.

19. The storage medium of claim 15, wherein the metadata includes at least one of identification of a positive or negative response by a human occupant, responsive to a vehicle state change action generated based on the model and the positive or negative response indicating whether the vehicle state change was accepted or modified, respectively or a response to a query asked directly, via a vehicle display, of a vehicle occupant, the query defined by the configuration file.

20. The storage medium of claim 15, wherein the configuration file defines an algorithm usable to modify the gathered data to produce a modified version of the gathered data and to determine a characteristic of the gathered data, used for labeling the gathered data, based on the modified version of the gathered data.

* * * * *